United States Patent [19]

Nakamura et al.

[11] Patent Number: 4,678,828
[45] Date of Patent: Jul. 7, 1987

[54] VIBRATION-DAMPING RUBBER COMPOSITION

[75] Inventors: Tsutomu Nakamura, Takasaki; Kiyoshi Imai, Annaka, both of Japan

[73] Assignee: Shin-Etsu Chemical Co., Ltd., Tokyo, Japan

[21] Appl. No.: 865,418

[22] Filed: May 21, 1986

[51] Int. Cl.$^4$ .......................... C08K 5/24; C08L 43/00
[52] U.S. Cl. ........................ 524/265; 524/269
[58] Field of Search .................. 524/265, 266, 269

[56] References Cited

U.S. PATENT DOCUMENTS

| | | | |
|---|---|---|---|
| 4,052,357 | 10/1977 | Marinik | 524/266 |
| 4,364,809 | 12/1982 | Sato et al. | 525/925 |
| 4,434,127 | 2/1984 | Baile | 524/265 |
| 4,579,636 | 4/1986 | Inoue et al. | 528/15 |

FOREIGN PATENT DOCUMENTS 621861  6/1961  Canada ................. 524/266

Primary Examiner—Joseph L. Schofer
Assistant Examiner—N. Sarofim
Attorney, Agent, or Firm—Hopgood, Calimafde, Kalil, Blaustein & Judlowe

[57] ABSTRACT

A rubber composition useful for shaping a vibration-damping rubber article is formulated with a synthetic rubber, which is preferably an organopolysiloxane gum, a finely divided silica filler having a specific surface area of at least 50 m$^2$/g and a specific $\alpha,\omega$-dihydroxy diorganopolysiloxane expressed, for example, by HO$+$SiMePh—O$\overline{)_m}$H, in which Me is a methyl group, Ph is a phenyl group and m is a positive integer of 2–20.

3 Claims, No Drawings

VIBRATION-DAMPING RUBBER COMPOSITION

BACKGROUND OF THE INVENTION

The present invention relates to a vibration-damping rubber composition or, more particularly, to a rubber composition useful for shaping a rubber article such as a vibration isolator capable of exhibiting an effect of vibration damping over a wide range of temperatures with improved temperature dependency.

As a material for vibration damping, various kinds of polymeric materials or rubbers are used for the purpose including, in particular, butyl rubbers having good vibration-damping power in comparison with other kinds of rubbers. Butyl rubbers are, however, not quite satisfactory as a vibration-damping material because of the large temperature dependency of the vibration-damping performance to give a limitation in their application to a relatively narrow temperature range. Silicone rubbers, on the other hand, are known to have outstandingly low temperature dependency in many of the mechanical properties while they are little effective as a vibration-damping material. Accordingly, a proposal has recently been made to combine the good vibration-damping power of butyl rubbers and the low temperature dependency of silicone rubbers by blending these two types of synthetic rubbers to obtain a vibration-damping rubber composition usable in a wide temperature range although no quite satisfactory results have yet been obtained in this way.

SUMMARY OF THE INVENTION

Thus, the present invention provides a novel rubber composition capable of giving a cured rubber which exhibits improved vibration damping performance over a wide range of temperatures without the problems in the above mentioned prior art rubber compositions. The vibration-damping rubber composition of the invention comprises:

(a) 100 parts by weight of a synthetic rubbery polymer;

(b) from 10 to 100 parts by weight of a finely divided siliceous powder having a specific surface area of at least 50 m$^2$/g; and (c) from 3 to 20 parts by weight of a diorganopolysiloxane terminated at both molecular chain ends each with a silanolic hydroxy group, i.e. a hydroxy group directly bonded to a silicon atom, and represented by the general formula $$HO\text{---}(SiR^1R^2\text{---}O)_{\overline{m}}(SiMe_2\text{---}O)_{\overline{n}}H, \quad (I)$$

in which Me is a methyl group, $R^1$ is a substituted or unsubstituted monovalent hydrocarbon group, $R^2$ is a phenyl group or an alkyl group having 2 to 10 carbon atoms, the subscript m is a positive integer not larger than 20 and the subscript n is zero or a positive integer not larger than 20 with the proviso that m+n is 2 or larger. It is preferable that n is equal to zero.

DETAILED DESCRIPTION OF THE PREFERRED EMBODIMENTS

In connection with the performance of a vibration-damping rubber which can be typically evaluated by the vibration transmission T, a theoretical consideration using a model of degree of freedom given, for example, by J. C. Snowdon, Vibration and Shock in Damped Material Systems (1968) has led to an equation giving a relationship between T and several parameters shown below:

(II)

in which T is the vibration transmission, $\omega$ is the angular frequency of the outer force to cause vibration, $\omega_0$ is the natural frequency of the system given by $\omega_0=\sqrt{k/m}$, k and m being the spring constant and mass of the supporting body, respectively, and tan $\delta$ is the loss factor.

On the other hand, the performance of a vibration-damping rubber can be correlated to the energy dissipation when the rubber receives an impact force and the efficiency of energy dissipation can be represented by the coefficient of impact resilience R which can be determined by the impact resilience test specified in JIS K 6301. It is known that the coefficient of impact resilience R in % is given approximately by exp($-2\pi$ tan $\delta$)$\times$100. Namely, a rubber having good vibration-damping performance should have a large value of tan $\delta$ or a small coefficient of impact resilience R.

Utilizing the coefficient of impact resilience R determined by the procedure specified in JIS K 6301 and the value of tan $\delta$ determined by use of a viscoelastic spectrometer (manufactured by Iwamoto Works Co.) as a guide for the evaluation of various rubber compositions, the above described unique formulation of the vibration-damping rubber composition of the invention has been established as a result of the extensive investigations undertaken by the inventors.

The principal ingredient of the inventive vibration-damping rubber composition, i.e. component (a), is a synthetic rubbery polymer which is not limited to particular types. Suitable rubbery polymers should exhibit rubbery elasticity by crosslinking and include ethylene-based copolymers, e.g. copolymers of ethylene and propylene, copolymers of ethylene and ethyl acrylate, copolymers of ethylene and vinyl acetate, copolymers of ethylene and methyl methacrylate and the like, dienic copolymers, e.g. copolymers of isobutylene and isoprene and the like, organopolysiloxane gums and others.

Among the above named various rubbery polymers, organopolysiloxane gums are preferred in view of the outstandingly small temperature dependency of the mechanical properties. An organopolysiloxane gum is a polymer represented by the average unit formula

in which R is a substituted or unsubstituted monovalent hydrocarbon group exemplified by alkyl groups, e.g. methyl, ethyl, propyl and butyl groups, alkenyl groups, e.g. vinyl and allyl groups, and aryl groups, e.g. phenyl and tolyl groups, as well as those substituted groups obtained by replacing a part or all of the hydrogen atoms in the above named hydrocarbon groups with substitutents such as halogen atoms, cyano groups, mercapto groups and the like such as chloromethyl, 3,3,3-trifluoropropyl, cyanopropyl and mercaptopropyl groups, and the subscript a is a positive number in the range from 1.99 to 2.02. Two or more kinds of the hydrocarbon groups can be contained simultaneously in a molecule although it is preferable that at least 50% by moles of the monovalent hydrocarbon groups denoted by R are methyl groups. The limitation in the value of the subscript a means that the organopolysiloxane is a diorganopolysiloxane having a substantially linear molecular structure. The organopolysiloxane should preferably have a viscosity of at least 1000 centistokes at 25° C.

The above defined organopolysiloxane or, in particular, diorganopolysiloxane can be prepared by a method well known in the art. For example, an oligomeric cyclic organopolysiloxane composed of 3 to 5 diorganosiloxane units is subjected to a ring-opening polymerization reaction in the presence of an alkali catalyst. Alternatively, a (co)hydrolyzate of an organochlorosilane or a mixture of organochlorosilanes can be polymerized in the presence of a condensation catalyst or an equilibration catalyst to give an organopolysiloxane. The degree of polymerization of the organopolysiloxane can be in a wide range corresponding to an oily to gummy viscosity or consistency.

The molecular chain ends of the organopolysiloxane can be terminated with various kinds of groups including trimethyl siloxy, dimethyl vinyl siloxy and methyl phenyl vinyl siloxy groups. It is preferable that at least one vinyl group is bonded to each of the terminal silicon atoms.

The component (b) in the inventive rubber composition is a finely divided siliceous powder which can be any of silica fillers well known in the art of rubbers or, in particular, silicone rubbers including fumed and precipitated silica fillers. The siliceous powder should have a specific surface area of at least 50 m$^2$/g in order to exhibit a substantial effect of rubber reinforcement and effect of vibration damping.

The amount of the finely divided siliceous powder in the inventive rubber composition should be in the range from 10 to 100 parts by weight or, preferably, from 30 to 60 parts by weight per 100 parts by weight of the synthetic rubbery polymer as the component (a). When the amount of the siliceous powder is too small, the desired vibration-damping effect can hardly be obtained. When the amount thereof is too large, on the other hand, the rubber composition cannot give a cured rubber having good mechanical properties in addition to the difficulty encountered in compounding. It is optional according to need that a small amount of other siliceous powders such as finely pulverized quartz powder and diatomaceous earth is added in combination with the above defined finely divided siliceous powder. In some cases, further improved vibration-damping effects can be obtained by the combined use of such a relatively coarse siliceous powder.

The component (c), which is the most characteristic constituent of the inventive rubber composition, is a specific organopolysiloxane represented by the general formula (I) given before. In the formula, $R^1$ is a substituted or unsubstituted monovalent hydrocarbon group exemplified by those groups given as the examples of the group denoted by R in the average unit formula representing the organopolysiloxane as the component (a) but is preferably a methyl or phenyl group or, more preferably, a methyl group. The group denoted by $R^2$, on the other hand, is necessarily an alkyl group having 2 to 10 carbon atoms or a phenyl group. $R^2$ is preferably a phenyl group. The subscript m is a positive integer of 1 to 20 and n is zero or a positive integer of 1 to 20 with the proviso that m+n is 2 or larger. Typical examples of the organopolysiloxane as the component (c) include those expressed by the following structural formulas, denoting methyl and phenyl groups by the symbols Me and Ph, respectively:

HO$+$SiMePh—O$)_{\overline{m}}$H, in which m is a positive integer of 4 to 6; and HO$+$SiPh$_2$—O$)_{\overline{p}}$(SiMe$_2$—O$)_{\overline{q}}$H, in which p and q are each a positive integer of 2 to 4. These α,ω-dihydroxy-terminated organopolysiloxanes can be prepared by the (co)hydrolysis and partial (co)-condensation reactions of methyl phenyl dichlorosilane or a mixture of diphenyl dichlorosilane and dimethyl dichlorosilane, respectively.

The amount of the α,ω-dihydroxy-terminated organopolysiloxane as the component (c) in the inventive rubber composition should be in the range from 3 to 20 parts by weight or, preferably, from 5 to 10 parts by weight per 100 parts by weight of the synthetic rubber as the component (a).

The rubber composition of the invention can be prepared by uniformly compounding the above described components (a), (b) and (c) in a suitable rubber compounding machine such as a two-roller mill, kneader, Banbury mixer and the like. The inventive rubber composition can be admixed with various kinds of known rubber additives according to need including heat resistance improvers, e.g. titanium dioxide, iron oxide, ceric oxide and barium zirconate, flame retardants, e.g. halogen-containing organic compounds and antimony oxide, various kinds of carbon-functional silanes and others. The rubber composition also should contain a cross-linking or vulcanizing agent exemplified by organic peroxides, sulfur and sulfur compounds depending on the type of the synthetic rubbery polymer to be cross-linked. Exemplary of the organic peroxide are dicumyl peroxide, di-tert-butyl peroxide, tert-butyl cumyl peroxide, 2,5-dimethyl-2,5-di(tert-butyl peroxy) hexane, 2,5-dimethyl-2,5-di(tert-butyl peroxy) hexyne, 1,1-bis(tert-butyl peroxy)-3,3,5-trimethyl cyclohexane and the like. Typical sulfur compounds as the vulcanizing agent are di(pentamethylene thiuram) tetrasulfide and tetramethyl thiuram monosulfide.

In the following, the vibration-damping rubber composition of the invention is illustrated in more detail by way of Examples and Comparative Examples, in which the expression of "parts" always refers to "parts by weight" and the symbols Me, Vi and Ph denote methyl, vinyl and phenyl groups, respectively.

EXAMPLE 1 AND COMPARATIVE EXAMPLES 1 AND 2

A compound was prepared by uniformly kneading, on a two-roller mill, 100 parts of a gum-like methyl vinyl polysiloxane having an average degree of polymerization of about 10,000 and composed of 99.83% by moles of the dimethylsiloxane units Me$_2$SiO, 0.15% by moles of the methyl vinyl siloxane units MeViSiO and 0.02% by moles of the dimethyl vinyl siloxane end groups Me$_2$ViSiO$_{0.5}$, 40 parts of a finely divided fumed silica filler having a specific surface area of 200 m$^2$/g (Aerosil 200, a product by Nippon Aerosil Co.) and 10 parts of an α,ω-dihydroxy methyl phenyl polysiloxane of the formula

in which m is a number of 4 to 6, and the compound was subjected to a heat treatment at 150° C. for 2 hours in a kneader.

A 100 parts portion of the above prepared compound was admixed and uniformly blended, in the kneader, with 0.5 part of 2,5-dimethyl-2,5-bis(tert-butyl peroxy) hexane and then shaped and cured by compression molding at 170° C. for 15 minutes under a pressure of 100 kg/cm$^2$ into a cylindrical block having a diameter of 29.0 mm and a height of 12.7 mm, which is referred to as the test specimen A hereinbelow, and coefficient of impact resilience thereof was determined at 25° C. and at 80° C. according to the procedure specified in JIS K 6301 to give the results of 33% and 40%, respectively.

For comparison, two further cylindrical rubber blocks, referred to as the test specimens B and C, were prepared in the same manner as above except that the finely divided fumed silica filler was replaced with the same amount of a silica powder having a specific surface area of 19 m$^2$/g (Crystalite VXS, a product by Tatsumori Co.) for the test specimen B and that the $\alpha,f$-dihydroxy methyl phenyl polysiloxane was replaced with the same amount of an $\alpha,\omega$-dihydroxy dimethyl polysiloxane having an average degree of polymerization of about 10 for the test specimen C. The coefficients of impact resilience of the test specimens B and C were: 77% and 51%, respectively, at 25° C. and 85% and 75%, respectively, at 80° C.

EXAMPLES 2 TO 4

Three silicone rubber compounds were prepared each by uniformly blending, on a two-roller mill, 100 parts of a gum-like methyl phenyl polysiloxane having an average degree of polymerization of about 8000 and composed of 89.825% by moles of the dimethylsiloxane units Me$_2$SiO, 0.150% by moles of methyl vinyl siloxane units MeViSiO, 10.0% by moles of the diphenylsiloxane units Ph$_2$SiO and 0.025% by moles of dimethyl vinyl siloxane end groups Me$_2$ViSiO$_{0.5}$, 40 parts of the same finely divided fumed silica filler as used in Example 1 (Aerosil 200, supra) and 5, 7 and 10 parts of the same $\alpha,\omega$-dihydroxy methyl phenyl polysiloxane as used in Example 1 for Examples 2, 3 and 4, respectively, and, after kneading and a heat treatment at 150° C. for 2 hours in a kneader, each of the compounds was further admixed with 0.5 part of dicumyl peroxide and uniformized.

In the next place, the compounds were each shaped and cured by compression molding under the same conditions as in Example 1 into cylindrical blocks having a diameter of 29.0 mm and a height of 12.7 mm, which are referred to as the test specimens D, E and F for Examples 2, 3 and 4, respectively, of which the coefficients of impact resilience were determined to give values of 52%, 35% and 23%, respectively, at 25° C. and 65%, 47% and 35%, respectively, at 80° C.

EXAMPLE 5 AND COMPARATIVE EXAMPLE 3

A silicone rubber compound was prepared by uniformly blending, on a two-roller mill, 100 parts of the same gum-like methyl phenyl polysiloxane, 40 parts of the same finely divided fumed silica filler (Aerosil 200, supra) and 10 parts of the same $\alpha,\omega$-dihydroxy methyl phenyl polysiloxane each as used in the preceding examples followed by kneading and a heat treatment at 150° C. for 2 hours in a kneader. The compound was further admixed with 60 parts of a silica powder having a specific surface area of 19 m$^2$/g (Crystalite VXS, supra) and 0.5 part of 2,5-dimethyl-2,5-bis(tert-butyl peroxy) hexane and uniformized. The thus prepared silicone rubber compound was shaped and cured by compression molding under the same conditions as in the preceding examples into a cylindrical block of the same dimensions as in the preceding examples and also into a rubber sheet. These rubber articles are referred to as the test specimens G hereinbelow.

For comparison, another rubber compound was prepared by uniformly blending 100 parts of a butyl rubber (Butyl 365, a product by Japan Synthetic Rubber Co.), 40 parts of the same finely divided fumed silica filler as used above (Aerosil 200, supra), 5 parts of zinc oxide, 1 part of stearic acid and 15 parts of a process oil followed by further admixture of 2 parts of sulfur, 0.5 part of 2-mercaptobenzothiazole and 1.0 part of tetramethyl thiuram monosulfide. This rubber compound was shaped and cured into a cylindrical block and sheet in the same manner as above. These rubber articles are referred to as the test specimens H hereinbelow.

The thus prepared test specimens G and H were each subjected to the measurements of the coefficient of impact resilience, loss factor tan δ at a frequency of 30 Hz and mechanical properties including hardness, tensile strength and ultimate elongation to give the results shown in Table 1 below. The measurement of the mechanical properties was undertaken according to JIS K 6301 and the loss factor was measured using a rubber specimen having dimensions of 20 mm by 3 mm by 1 mm.

TABLE 1

| Test specimen | | G | H |
| --- | --- | --- | --- |
| Coefficient of impact resilience at 25° C., % | | 20 | 18 |
| Hardness, JIS | | 52 | 54 |
| Tensile strength, kg/cm$^2$ | | 80 | 120 |
| Ultimate elongation, % | | 570 | 600 |
| Loss factor, tan δ | at −40° C. | 0.41 | 0.7 |
| | at 0° C. | 0.40 | 0.5 |
| | at 50° C. | 0.35 | 0.15 |

As is clear from Table 1, the test specimen G is advantageous over H in respect of the much smaller temperature dependency of the loss factor tan δ.

EXAMPLES 6 AND 7 AND COMPARATIVE EXAMPLES 4 AND 5

Four rubber compounds I, J, K and L were prepared each by uniformly blending 100 parts of a synthetic rubber which was either an EPDM rubber (EPT 3045, a product by Mitsui Petrochemical Co.) or a butyl rubber (Butyl 365, supra, referred to as IIR), 40 parts of the same finely divided fumed silica filler as used in the preceding examples (Aerosil 200, supra), 5 parts of zinc oxide, 1 part of stearic acid and 20 parts of a process oil together with (compounds I and J) or without (compounds K and L) 10 parts of an $\alpha,\omega$-dihydroxy methyl phenyl polysiloxane having an average degree of polymerization of 4 to 6 and with a vulcanizing agent which was either 2.5 parts of dicumyl peroxide, referred to as the peroxide, (compounds I and K) or a combination of 2.0 parts of sulfur, 0.5 part of 2-mercaptobenzothiazole and 1.0 part of tetramethyl thiuram monosulfide, referred to as S+M+TS, (compounds J and L) as is indicated in Table 2 below. Each of these rubber compounds was shaped and cured into a cylindrical block as a test specimen in the same manner as in the preceding examples, of which the coefficient of impact resilience was determined at 25° C. and 60° C. to give the results shown in Table 2.

TABLE 2

| Rubber compound | I | J | K | L |
|---|---|---|---|---|
| Synthetic rubber | EPDM | IIR | EPDM | IIR |
| α,ω-Dihydroxy methyl phenyl polysiloxane | Yes | Yes | No | No |
| Vulcanizing agent | Peroxide | S + M + TS | Peroxide | S + M + TS |
| Coefficient of impact resilience, % | | | | |
| at 25° C. | 38 | 12 | 52 | 18 |
| at 60° C. | 48 | 24 | 70 | 40 |

EXAMPLES 8 AND 9

A 2:1 by moles mixture of methyl phenyl dichlorosilane and dimethyl dichlorosilane was subjected to cohydrolysis and partial cocondensation reaction to give an α,ω-dihydroxy-terminated diorganopolysiloxane of the formula

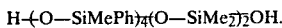
H—(O—SiMePh)$_4$(O—SiMe$_2$)$_2$OH.

A silicone rubber composition was prepared by uniformly blending, on a two-roller mill, 100 parts of the same gum-like methyl phenyl polysiloxane as used in Examples 2 to 4, 40 parts of the finely divided fumed silica filler (Aerosil 200, supra) and 10 parts of the above prepared α,ω-dihydroxy-terminated diorganopolysiloxane followed by kneading and a heat treatment at 150° C. for 2 hours in a kneader and then with admixture of 0.5 part of 2,5-dimethyl-2,5-bis(tert-butyl peroxy) hexane and uniformization.

The thus obtained silicone rubber composition was shaped into a cured rubber sheet by compression molding at 170° C. for 15 minutes under a pressure of 100 kg/cm$^2$ and a test specimen of 1 mm by 3 mm by 20 mm, referred to as the test specimen M hereinbelow, was taken therefrom.

Separately, another test specimen, referred to as the test specimen N hereinbelow, was prepared in the same manner as above except that the α,ω-dihydroxy-terminated diorganopolysiloxane was replaced with the same amount of another α,ω-dihydroxy-terminated diorganopolysiloxane of the formula H—O—SiMe(C$_8$H$_{17}$)]$_{16}$OH prepared by the hydrolysis and partial condensation reaction of methyl n-octyl dichlorosilane as a product of the addition reaction between n-octene-1 and methyl dichlorosilane in the presence of a platinum catalyst.

Each of the test specimens M and N was subjected to the measurement of tan δ at —40° C., 0° C. and 50° C. to give the results of 0.40, 0.38 and 0.33, respectively, for the test specimen M and 0.38, 0.35 and 0.30, respectively, for the test specimen N.

What is claimed is:

1. A vibration-damping rubber composition which comprises:
   (a) 100 parts by weight of a synthetic rubbery polymer;
   (b) from 10 to 100 parts by weight of a finely divided siliceous powder having a specific surface area of at least 50 m$^2$/g; and
   (c) from 3 to 20 parts by weight of a diorganopolysiloxane terminated at both molecular chain ends with a silanolic hydroxy group and represented by the formula

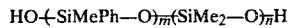
HO—(SiMePh—O)$_m$(SiMe$_2$—O)$_n$H in which Me is a methyl group, Ph is a phenyl group,
the subscript m is a positive integer not larger than 20 and the subscript n is zero or a positive integer not larger than 20 with the proviso that m+n is 2 or larger.

2. The vibration-damping rubber composition as claimed in claim 1 wherein the subscript n is zero.

3. The vibration-damping rubber composition as claimed in claim 1 wherein the synthetic rubbery polymer is an organopolysiloxane having a viscosity of at least 1000 centistokes at 25° C. and represented by the average unit formula

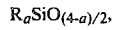
R$_a$SiO$_{(4-a)/2}$, in which R is a substituted or unsubstituted monovalent hydrocarbon group and the subscript a is a positive number in the range from 1.99 to 2.02.

* * * * *